(12) United States Patent
Browne et al.

(10) Patent No.: US 7,597,616 B2
(45) Date of Patent: Oct. 6, 2009

(54) ACTIVE MATERIAL ENABLED VENTS AND METHODS OF USE

(75) Inventors: Alan L. Browne, Grosse Pointe, MI (US); Robin Stevenson, Bloomfield, MI (US); Nancy L. Johnson, Northville, MI (US); Nilesh D. Mankame, Ann Arbor, MI (US); Xiujie Gao, Troy, MI (US); Paul W. Alexander, Ypsilanti, MI (US); James Bloomsburgh, Berkeley, CA (US); John Czoykowski, St. Clair Shores, MI (US); Neal Parsons, Onsted, MI (US); Jason R. Spenny, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 49 days.

(21) Appl. No.: 11/734,297

(22) Filed: Apr. 12, 2007

(65) Prior Publication Data

US 2007/0243810 A1 Oct. 18, 2007

Related U.S. Application Data

(60) Provisional application No. 60/791,992, filed on Apr. 13, 2006.

(51) Int. Cl.
*B60H 1/34* (2006.01)
*B60H 1/00* (2006.01)
(52) U.S. Cl. .................. 454/155; 454/69; 454/143; 454/152
(58) Field of Classification Search .................. 454/69, 454/152, 153, 154, 155
See application file for complete search history.

(56) References Cited

U.S. PATENT DOCUMENTS

| 3,298,298 | A | * | 1/1967 | Iwata | 454/258 |
| 4,979,672 | A | * | 12/1990 | AbuJudom et al. | 236/68 B |
| 5,063,833 | A | * | 11/1991 | Hara et al. | 454/152 |
| 5,662,294 | A | * | 9/1997 | Maclean et al. | 244/219 |
| 5,752,877 | A | * | 5/1998 | Sun | 454/155 |
| 6,347,987 | B1 | * | 2/2002 | Ichishi et al. | 454/75 |
| 6,446,876 | B1 | * | 9/2002 | Stefano et al. | 236/49.3 |
| 6,793,572 | B2 | * | 9/2004 | Kodak | 454/144 |
| 2002/0129933 | A1 | * | 9/2002 | Ozeki et al. | 165/203 |
| 2002/0130754 | A1 | * | 9/2002 | Alacqua et al. | 337/118 |
| 2004/0002298 | A1 | * | 1/2004 | Osada et al. | 454/155 |
| 2005/0000574 | A1 | * | 1/2005 | MacGregor et al. | 137/625.3 |

FOREIGN PATENT DOCUMENTS

| JP | 61171885 | A | * | 8/1986 |
| JP | 62096130 | A | * | 5/1987 |
| JP | 01229716 | A | * | 9/1989 |
| JP | 2001324209 | A | * | 11/2001 |

* cited by examiner

*Primary Examiner*—Steven B McAllister
*Assistant Examiner*—Patrick F. O'Reilly, III

(57) ABSTRACT

A vent includes a vane configured for spatial movement, and at least one actuator in operative communication with the vane configured to spatially move the vane in at least one direction, wherein the actuator comprises an active material configured to undergo a change in at least one property upon receipt of an activation signal, wherein the change in at least one property is effective to selectively change an orientation of the vane.

15 Claims, 6 Drawing Sheets

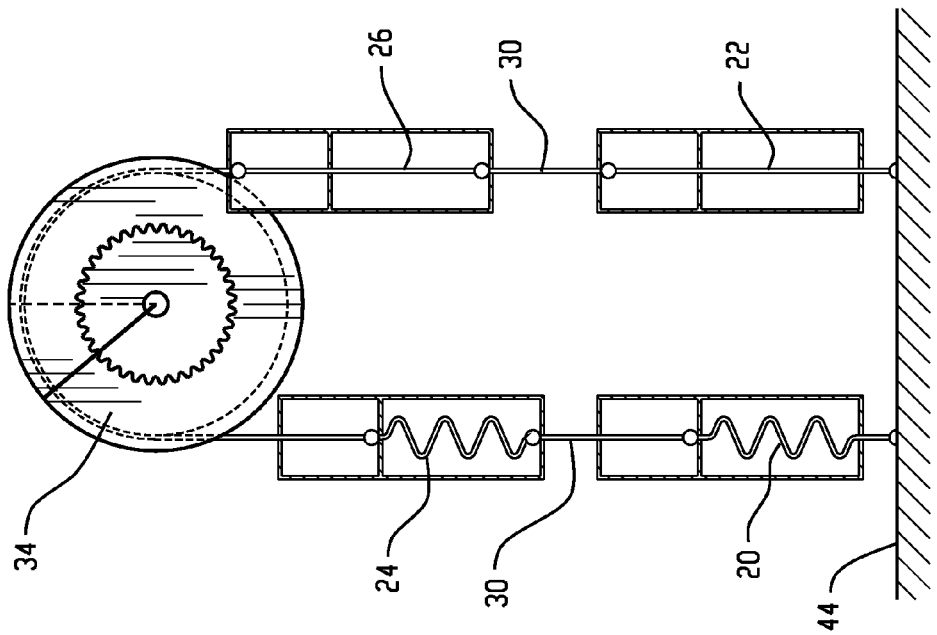
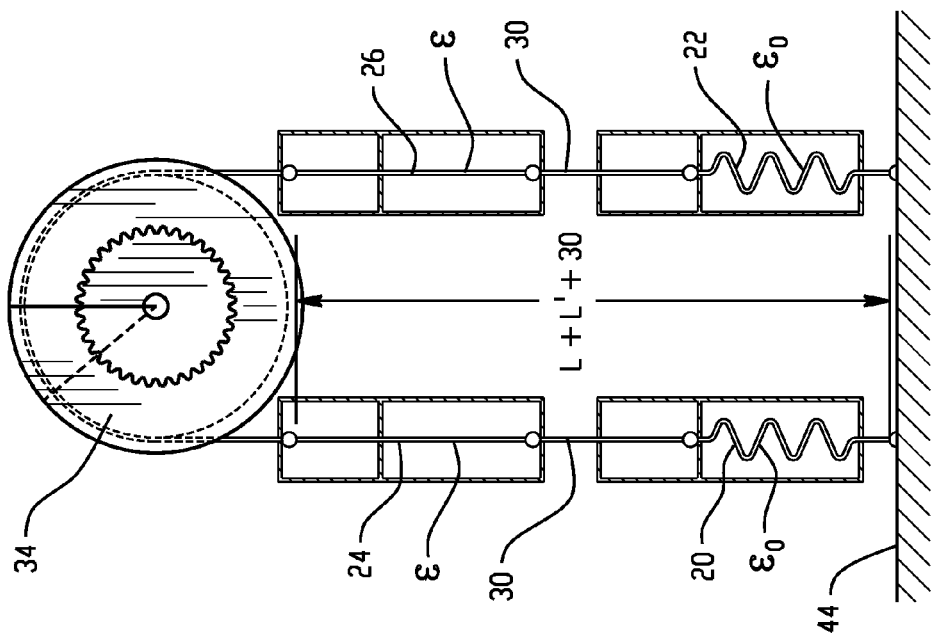
Fig. 3A
Fig. 3B

ACTIVE MATERIAL ENABLED VENTS AND METHODS OF USE

CROSS REFERENCE TO RELATED APPLICATIONS

The present application relates to and claims the benefit of priority to U.S. Provisional Application No. 60/791,992 filed Apr. 13, 2006, incorporated herein by reference in its entirety.

BACKGROUND

The present disclosure generally relates to vents and methods for controlling vents, such as those used in a heating, ventilation, and air conditioning systems. This disclosure particularly addresses vents having active materials.

Heating, ventilation, and air conditioning systems, such as those found in a motor vehicle, commonly include multiple vents for controlling the distribution of air. Motor vehicle vents generally have two sets of parallel vanes, wherein each set of vanes is perpendicular to the other, such that one set affects horizontal distribution of airflow and the other set affects vertical distribution of airflow within the vehicle interior. The vehicle driver or passengers can manually adjust the orientation of the vanes by means of a slide lever, knob, pivoting mechanism, or the like. However, such manual operation can be difficult for some drivers (due to age, medical conditions, and the like) and can divert attention away from the road.

Accordingly, there is a need for improved vents and methods for automatically controlling the vents such that increased convenience and accessibility for vehicle users can be achieved.

BRIEF SUMMARY

Disclosed herein are active material enabled vents in accordance with exemplary embodiments. In one embodiment, a vent includes a vane configured for spatial movement, and at least one actuator in operative communication with the vane configured to pivotably move the vane in at least one direction, wherein the actuator comprises an active material configured to undergo a change in at least one property upon receipt of an activation signal, wherein the change in at least one property is effective to selectively change an orientation of the vane.

A method for controlling a condition of airflow in a vehicle, includes activating an active material in an actuator in operative communication with a vane configured for spatial movement, wherein the active material is configured to undergo a change in a property upon receipt of an activation signal, wherein the change in a property is effective to selectively change an orientation of the vane; and changing the orientation of the vane.

In another embodiment, a vent for a motor vehicle ventilation system, includes at least one vane configured for pivotal movement, at least one actuator in operative communication with the vane and configured to spatially move the vane in multiple directions, wherein the actuator comprises at least one shape memory alloy element configured to undergo a contraction in a length dimension upon receipt of a heat signal, wherein the contraction in a length dimension is effective to selectively change an orientation of the one or more vanes, a stroke adjuster in operative communication with the shape memory alloy configured to prevent overloading of the shape memory alloy, a baffle plate in operative communication with the vane and the actuator, wherein the baffle plate comprises a second shape memory alloy and a return mechanism, wherein the second shape memory alloy is configured to undergo a contraction in a length dimension upon receipt of a second heat signal, wherein the contraction in a length dimension is effective to transition the baffle plate from a stowed position to a deployed position, and the return mechanism is configured to return the baffle plate to the stowed position, and an activation device configured to provide a selected one or both of the first and the second heat signals.

The above described and other features are exemplified by the following figures and detailed description.

BRIEF DESCRIPTION OF THE DRAWINGS

Referring now to the figures, which are meant to be exemplary embodiments, and wherein the like elements are numbered alike:

FIGS. 3A-3E are schematic representations of the actuator of FIG. 2 in operation;

DETAILED DESCRIPTION

Vents and methods of their use are described herein. In contrast to existing vents, the vents disclosed herein are advantageously self-powered, meaning they do not need to be adjusted manually. The present disclosure further discloses vents that employ active materials. Even further, the present disclosure discloses methods for active material enabled control of the distribution (flow rate and/or direction) of air emitted from the vent, such as in heating, ventilation, and air conditioning systems found in a vehicle, home, or office. Advantageously, the effort required to adjust the vents can be significantly reduced for users of all ages, physical conditions, and statures. In another advantageous feature, the orientation of the vanes within the vents can also be manually controlled in the event of a power failure or if the vent-user prefers manual adjustment. The term "active material" as used herein generally refers to a material that exhibits a change in a property such as crystal structure, material morphology, dimension, shape, phase, orientation, modulus, stiffness, and the like upon application of an activation signal. Suitable active materials include, without limitation, shape memory alloys (SMA), ferromagnetic shape memory alloys (MSMA), shape memory polymers (SMP), piezoelectric materials, electroactive polymers (EAP), magnetorheological (MR) materials (includes fluids, impregnated foams & elastomers), electrorheological (ER) materials (includes fluids, impregnated foams & elastomers), and the like. Depending on the particular active material, the activation signal can take the form of, without limitation, an electric current, an electric field (voltage), a temperature change, an electromagnetic field, an optical signal, a vibratory signal, an acoustic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

Figure 1:
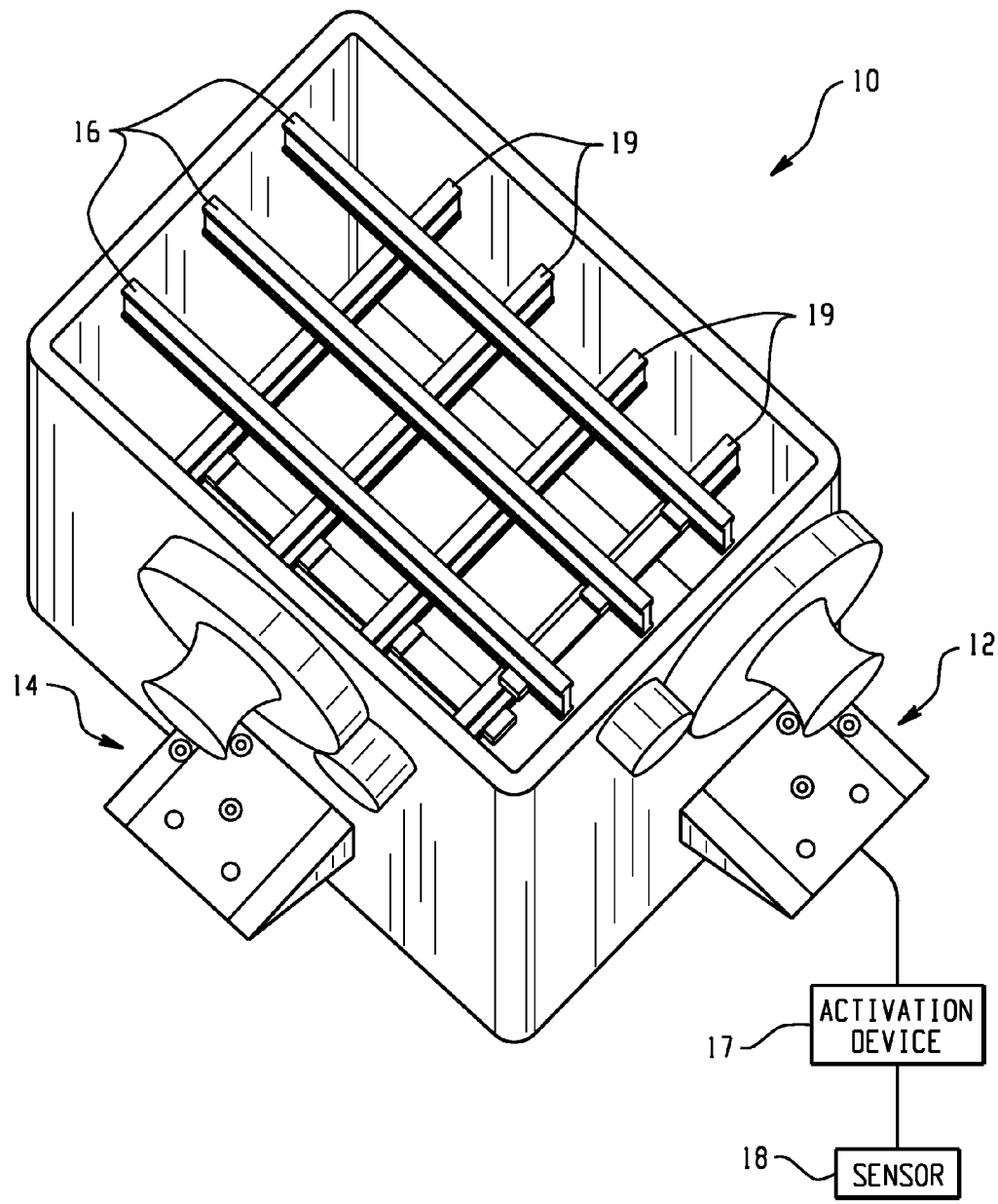
FIG. 1 is a schematic representation of an active material enabled vent.

An exemplary vent is shown in FIG. 1, and is generally designated by reference numeral 10. The vent 10 includes a (i.e., at least one) vane configured for spatial (e.g., pivotal) movement. As shown in this figure, the vent 10 comprises a set of substantially parallel vanes 16. In operative communication with the set of parallel vanes 16 is an actuator 12. Upon receipt of an activation signal from an activation device 17, the actuator 12 effects a change in the orientation of the set of two or more vanes 16, resulting in a change in a condition of airflow from the vent 10. As used herein, the term "condition" is generally intended to mean, without limitation, a flow rate, spatial distribution, volume, velocity, temperature, and the like.

Optionally, the vent 10 can have a second set of substantially parallel vanes 19. In one embodiment, as seen in FIG. 1, the second set of vanes 19 is perpendicular to the first set of vanes 16. The second set of vanes 19 are in operative communication with a second actuator 14, which is configured to effect a change in the orientation of the second set of vanes 19 upon receipt of an activation signal from the same activation device 17 or a second activation device (not shown).

The actuator 12 (and/or 14) can be an electromechanical actuator, a transmission, or an active material based actuator. In motor vehicle applications, where space is limited, it is desirable that the actuator 12 and the activation device 17 are sufficiently small, such that they do not substantially increase the size of the overall vent 10. Furthermore, it is also desirable for the actuator 12 to operate in a quiet manner. Accordingly, in an exemplary embodiment, the actuator 12 comprises an active material.

Figure 2:
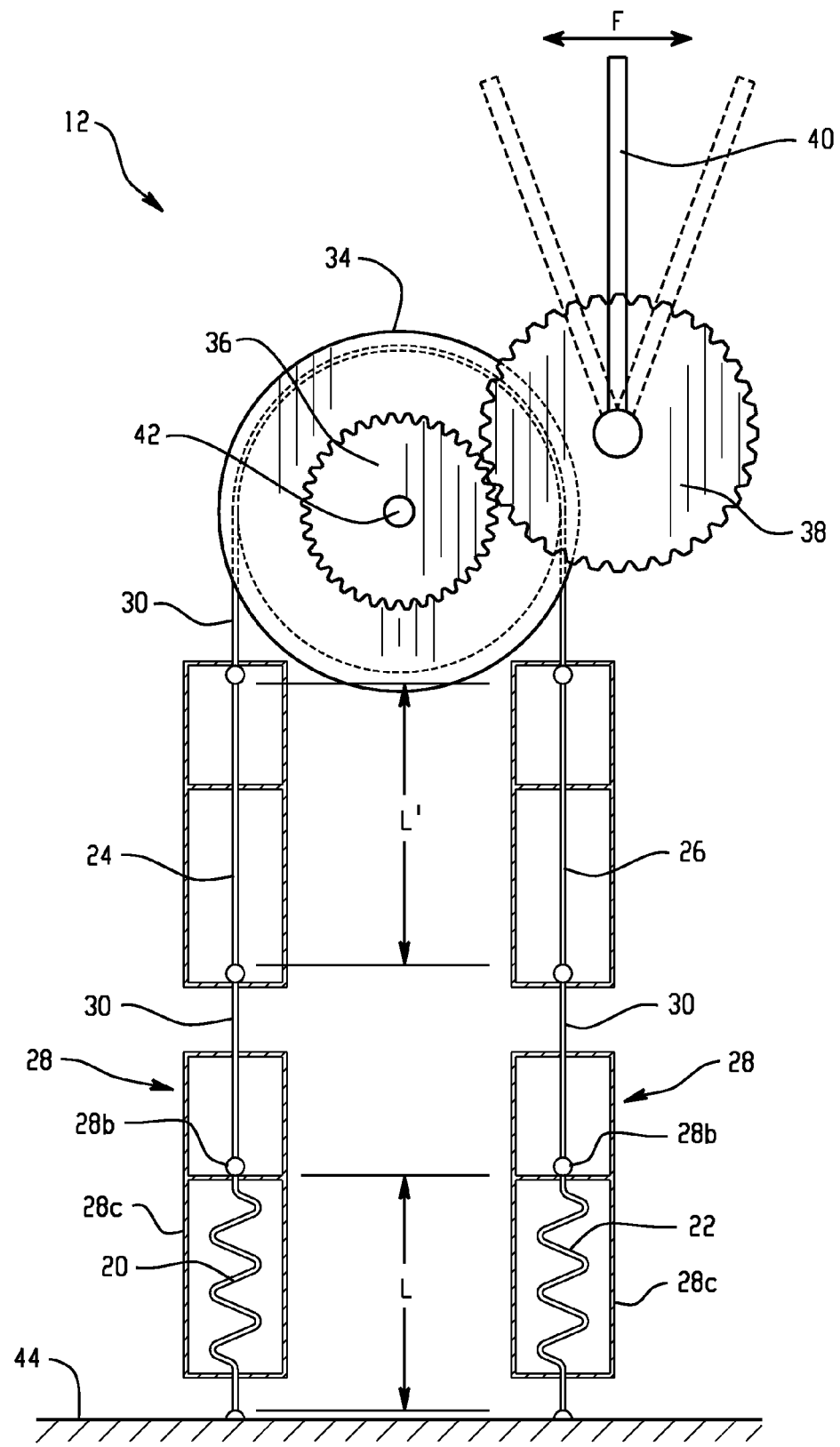
FIG. 2 is a schematic representation of an active material actuator.

An exemplary active material actuator 12 is shown in FIG. 2. While reference will be made to SMA, it should be understood that any active material described above can be used either by itself or in combination with other materials. Moreover, additional information regarding the operation and properties of each active material listed above will be described in greater detail below. The actuator 12 is in operative communication with the vanes 16 and is configured to move the vanes in multiple directions including opening and closing of the vent 10. The vane 16 can be manually operated by a vane 40, which is also effective to move the vanes 16 by rotating the pulley 34 to which the vanes 16 are connected.

The actuator 12 is able to pivotably move the vanes 16 using two sets of antagonistically configured sub-actuators, each set of which includes at least two binary sub-actuators (20, 22, 24, and 26). Each binary sub-actuator may be activated or deactivated independently or in synchronism with one or more of the other sub-actuators. In this embodiment, the binary sub-actuators (20, 22, 24, 26) of each antagonistic set are mechanically connected with one another in series. A functionally binary sub-actuator has only two positions that it can repeatably achieve; in this case the sub-actuators can repeatably transition between only two lengths. For illustrative purposes SMA wires will serve as the binary sub-actuators. The SMA wires 20 and 22 are in their low stiffness phase, are in the fully twinned martensite phase ($M^+=M^-$) and have a characteristic length L that can be stretched easily and are shown as a wavy, spring-like line. The SMA wires 24 and 26 are in the fully de-twinned martensite phase ($M^+$) or partially de-twinned martensite phase ($M^+>M^-$) and have a characteristic length L' (>L). The SMA wires 24 and 26, therefore, require a greater force to stretch and are shown as straight lines.

Stroke adjusters 28 are in operative communication with the SMA wires and are configured to restrict the extension and contraction of the SMA wires and to prevent overloading and/or overstraining of the wires by restricting the strain and/or force experienced by the wires to permissible values. Moreover, the stroke adjusters 28 provide precise adjustability to the stroke length of the SMA wires. The stroke adjusters further comprise a connection bead 28b and an overload protection and stroke adjuster frame 28c. The SMA wires 20 and 22 are held in position at one end by being fixed to a stationary surface 44. At the opposite end, the SMA wires 20 and 22 are connected to the SMA wires 24 and 26, respectively, by connecting elements 30. The connecting elements 30 can be any elements suitable for connecting the two sets of SMA wires, such as, without limitation, steel or Kevlar wires, crimps, or the like. Each connecting element may be designed to thermally and/or electrically isolate the sub-actuators that it connects from each other and the frame/ground. An additional connecting element 30 is wrapped around a pulley 34 that is in operative communication with a pinion 36. The pinion 36 drives a gear 38, which is in operative communication with a lever 40. The SMA wires can drive the lever 40 into any of the directions, such as the three illustrated: center (solid line), left (dashed line) or right (dashed line). The actuator 12 is in operative communication with the set of vanes 16 of the vent 10 at 42.

The "transmission" formed by the combination of the vane 40, gear 38, pinion 36, and pulley 34 is designed such that manual effort (F) applied at the end of the vane 40 can backdrive the transmission to cause stretching of the SMA wires 20 and 22 with a force whose magnitude is comparable to the effort required to operate the lever manually in the absence of the SMA wires. This imparts so-called "back drive-ability" to the actuator 12 at a load level that allows easy manual override of the SMA wires provided none of the SMA wires are activated during the manual override.

FIG. 3 illustrates the actuator 12 in the center position (as shown in FIG. 3(a)) and the left position (as shown in FIG. 3(b)). For simplicity, the manual components, i.e., pinion 36, gear 38, and lever 40 have been removed. In the center position, the total lengths of the two SMA wires 20-24 and 22-26 on each side of pulley 34 are equal to L plus L'. The SMA wires are configured to have a small pre-strain $\epsilon_0$ corresponding to the length L; and a strain $\epsilon$ corresponding to the length L', wherein $\epsilon$ is greater than $\epsilon_0$. To rotate the pulley 34 to the left position (indicated on the pulley 34 by the dashed line in FIG. 3(a) and the solid line in FIG. 3(b)), the SMA wires 20 and 24 are heated above the austenite finish temperature. The SMA wires can be heated independently or together using the same heat signal (i.e., activation device 17). No change in the SMA wire 20 will be effected because it is already in its fully retracted length. However, the SMA wire 24 undergoes a transformation from the $M^+$ phase to its austenitic phase. A strain recovery is generated in the SMA wire 24 which causes the SMA wire to contract in a length dimension from L' to L. The force of the strain recovery causes the SMA wire 22 to stretch in the $M^{+/-}$ phase from length L to L'. Now the total length of the SMA wires 22 and 26 is 2L'. This is greater than the total length of SMA wires 20 and 24, which is 2L. Since the center of pulley 34 remains a fixed distance from surface 44, the pulley 34 must rotate to the left position.

After rotation from the center position to the left position, the SMA wires 20 and 24 are cooled down to below the martensite finish temperature, where they revert back to the $M^{+/-}$ phase. The pulley 34, and consequently the set of vanes 16, will remain in the left position until another change in orientation is initiated by any of the SMA wires or by a manual effort on lever 40. In this manner, the actuator 12, and ultimately the vent 10, has a so-called "power-off hold feature".

To return from the left position to the center position, the SMA wires 20 and 22 can be heated above the austenite finish temperature. No change in the SMA wire 20 will be effected because it is already in its fully retracted position. However, SMA wire 22 undergoes a transformation from the $M^+$ phase to the austenite phase. A strain recovery is generated in the SMA wire 22 that causes SMA wire 22 to contract in a length dimension from L' back to L. The force of the strain recovery causes the SMA wire 24 to stretch in the $M^{+/-}$ phase from length L to L'. Now the total length of SMA wires 22 and 26 is equal to the total length of the SMA wires 20 and 24. Again, since the center of pulley 34 remains a fixed distance from surface 44, the pulley 34 must rotate from the left position to the center position.

To rotate from the center position to the right position (not shown), the SMA wires 22 and 26 must be heated above the austenite finish temperature. Conceptually, this is symmetric to the rotation from the center position to the left position. Finally, to return from the right position to the center position, the SMA wires 20 and 22 must be heated above the austenite finish temperature. Conceptually, this rotation from the right position to the center position is symmetric to the rotation from the left position to the center position. Moreover, the change in a property of the active materials (in this case the SMA wires) in actuator 12 is effective to change the orientation of the vanes 16, thereby changing the horizontal direction of airflow. Similarly, the change in a property of the SMA wires in actuator 14 is effective to change the orientation of the vanes 19, thereby changing the vertical direction of airflow. In a motor vehicle embodiment, direction of a selected one of the vanes 16 and 19 can be effective to direct the air in a vertical manner, i.e., toward the cabin roof, neutral, or toward the vehicle floor. Likewise, direction of the opposite selected one of the vanes 16 and 19 can be effective to direct the air in horizontal manner, i.e., to the left, center, or right of a passenger and/or driver.

The above concept used four sub-actuators, each of which can only achieve two positions repeatably, to repeatably position the active material based vent in three possible ways without the need for feedback control. The sub-actuators are arranged in two antagonistic groups with each group comprising two sub-actuators connected mechanically in series. Activating a sub-set of these actuators in a specific sequence enables the vane to be positioned in three distinct ways. This embodiment can be generalized to achieve fewer or more positions by changing the number of sub-actuators in each group and the sequence of activation. While SMA wires were used to illustrate the concept, any other active material (e.g. EAP, piezoelectric materials, and the like) may be used to replace the SMA wires in the above concept without loss of functionality.

The use of the stroke adjusters 28 allow for any of the SMA wires to repeatably cycle between the two configurations of lengths L and L' respectively without requiring feedback control or any prior thermo-mechanical processing of the SMA to induce a specified pre-strain in the wire. Another advantage of using stroke adjusters 28 is that the operating stroke of each SMA wire can be restricted to a fraction of its maximum operating range (e.g., $\epsilon=0$-10 percent). As the life of the SMA actuator decreases significantly with increasing imposed strain, the stroke adjusters allow the designer to choose a stroke that ensures the desired life. In this embodiment, the stroke adjuster is used to restrict the length of the wire to lie between L and L'. For example, the stroke adjusters 28 can prevent overloading and/or overstraining of the active material, such that if the SMA wires are activated by an unwanted stimulus, excess strain on the SMA wires will not be experienced when they are subsequently activated by the activation device 17.

Figure 3C:
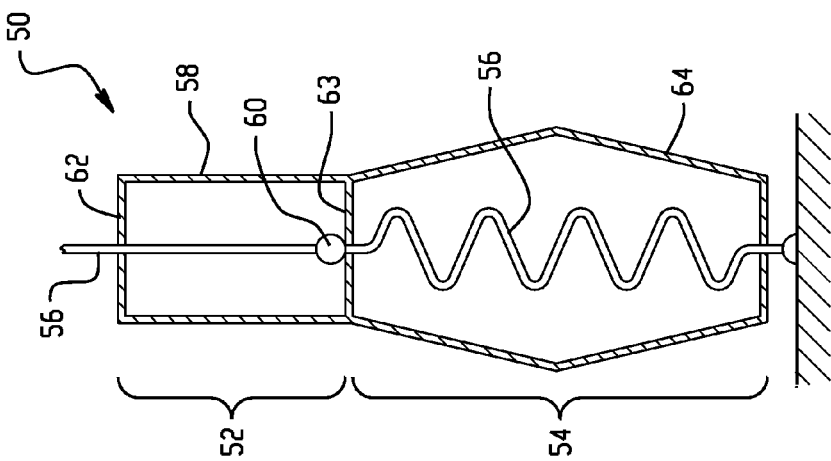

FIG. 3(c) further illustrates an exemplary embodiment of a stroke adjuster 50. The extension stroke adjuster 52 and the contraction stroke adjuster 54 are combined in a single element in this embodiment. The actuator wires 56 are passed through holes in the stroke limiter 58, and the bead 60 serves to restrain the end of the actuator wires 56 between the restraining members 62 and 63 of the stroke limiter 58.

Figure 3D:
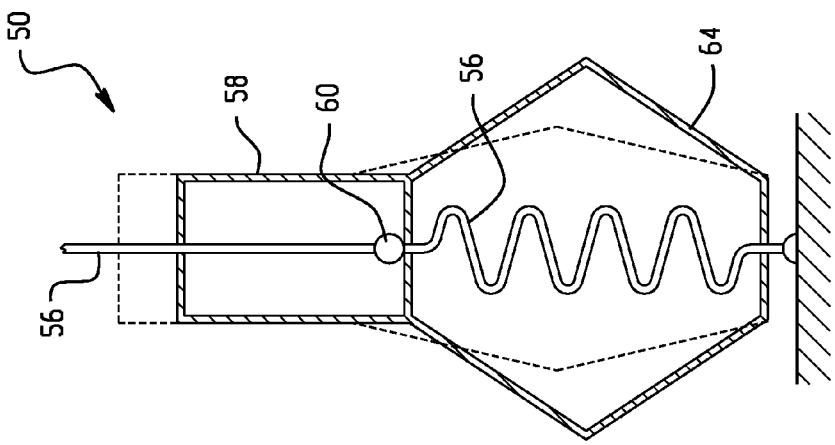

The stroke adjuster 50 as disclosed herein comprises an elastic element 64, which is mechanically in parallel with the actuator wires 56. When the elastic element 64 is loaded in compression, i.e., when the associated SMA wire tries to shrink to a length smaller than L, the elastic element's 64 initial stiffness is greater than the stiffness of the activated, A-phase, actuator wire 56. This serves to restrain the contraction of the wire. When the contraction stroke of the wire 56 is limited by the elastic element 64, the load carried by the element rises until it reaches a peak load ($F_{max} \leq F_{all}$), which is the maximum load that can be safely exerted by the wire 56. If the applied activation signal to the SMA wire is so high that the force in it can exceed $F_{max}$, the stroke adjuster 50 seeks to minimize the damage to the wire by reducing its stiffness sharply. This is achieved by the elastic element 64 passing a limit threshold in its elastic response at a load of $F_{max}$, which causes its stiffness to either stay constant or decrease as shown in FIG. 3(d). Thus, the elastic element 64 is able to limit the max load carried by the actuator wire 56 to $F_{max}$.

The stiffness of the stroke adjuster 50 in tension is much higher than that of the activated SMA wire and it serves to provide a hard stop against extension of the wire beyond the length L'. The extension stroke adjuster 52 does not require an overload protection mechanism as in the contraction case, but if necessary, the same mechanism can be adapted for this purpose.

Figure 3E:
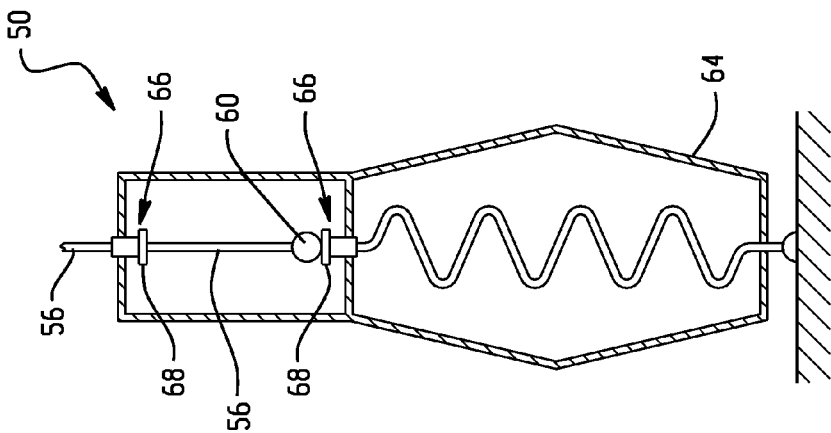

The positions corresponding to the lengths L and L' may be adjusted accurately using screws 66 that have central holes through which the wire 56 is passed, as shown in FIG. 3(e). The screws 66 are threaded into the elastic element 64 and the position of their heads 68, which bear against the crimp 60, can be moved relative to the elastic element 64 and locked in place. Another practical advantage of using a stroke adjuster is that it can be used to compensate for manufacturing variations, e.g. taking up the slack in the actuator wire 56 which may not have been cut to the exact required size.

An alternative to the active material enabled vent and sub-actuators described above, can comprise one or more SMA actuator elements used in an antagonistic fashion or in opposition to a restoring force, such as that exerted by a bias spring, to move a vane to multiple positions. In this embodiment, the reversible positioning of the active material enabled vent is achieved by using feedback control.

The term "activation device" is generally intended to mean a device capable of generating the activation signal, which can be generated, for example, in response to either a direct command, or in response to the result of processing data collected from one or more sensors in accordance with some control logic for the application at hand.

While reference was made to wires for simplicity, it should be understood that any shaped sub-actuator can be used in place of a wire. For example, a compression spring can be used instead of a wire. Similarly, instead of rotational motion, translational output motion can be produced by the actuator 12 to drive a slide and lever combination instead of a pulley.

In operation of the active material enabled vent 10 disclosed herein, several control or activation mechanisms can be used. In one motor vehicle embodiment, the controller used for operation of the individual vents 10 can also be used to control a second vehicle functional component, such as for example, the side mirrors. In this manner, the controller can be in operative communication with the active material and/or activation device and control the actuators 12 or 14. For example, instead of a two-way switch that allows the driver to switch between left and right side mirrors, a four-way switch can be implemented which allows the driver to individually control the left (driver side) and right (passenger side) vents 10 as well. In addition to the switch, the individual users (i.e., vehicle driver and passengers) are able to manually adjust the vent 10 configuration through use of the lever 40.

A plurality of vents 10 as described herein can be controlled together. Specifically, the overall distribution of air throughout a motor vehicle can be synchronized and controlled using one controller for the entire heating, ventilation, and air conditioning system. In one embodiment, a switch, knob, or the like can be used to selectively send an activation signal to the actuator(s) 12 (and/or 14) of specific vents 10 within the motor vehicle. For example, the switch, knob, or the like can be used to select between distributing air to the driver only, to the front row passenger only, to the driver and front row passenger, to the back row only, to back row driver side only, to the back row passenger side only, to the windows only, to the driver side windows only, to the passenger side windows only, equally throughout the vehicle, or to no one. In addition, there can be a manual option, wherein activation of the actuators 12 and 14 is suspended to allow for manual adjustment of the individual vents 10 throughout the motor vehicle.

In addition to user inputs, the vents 10 can also respond automatically to inputs from sensors 18 (FIG. 1) that are in operative communication with the activation device 17. Moreover, the vents and condition of the airflow from the vents can be selectively controlled and based on certain pre-specified automatic modes of operation initiated in response to an input from at least one information source. An information source can include, for example, a input from a sensor 18. Some examples of pre-specified modes of operation can include, without limitation, a defogging mode, a redirection of air to a specific region of the vehicle mode, a purge of a noxious vapor mode, a circulation mode after a transient condition, combinations of these modes, and the like. For example, in a motor vehicle, it is desirable to have interior cabin temperature and exterior ambient temperature sensors 18. Information from other vehicle-mounted sensors or meteorological information obtained by telecommunication from other vehicles or information sources may also be used to adjust the airflow within the vehicle. In this manner, the sensors can activate the activation device for a particular actuator once a predetermined threshold condition has been met, such as used in climate control systems.

Additionally, transient temperature periods (i.e., the periods during which a change in the temperature condition is being effected) can be addressed differently from steady-state conditions. As an example, instead of directing cold air at the occupant on a cold morning while the engine is cold, the vents 10 closest to the occupant can distribute air away from the occupant until the air temperature rises above a selected level. Once the threshold level has been achieved, the actuators 12 and 14 for the vents 10 closest to the occupant can be activated and distribution of air can be redirected to the driver. Alternatively, an auxiliary heater to reduce the warm-up time for the passenger compartment by providing a source of rapid heat while the engine is cold can be used.

In another embodiment, air could be prevented from flowing into the interior cabin until the temperature has reached a threshold level. The vanes 16 and 19 in the vents 10 can be in the closed position until the air reaches a predetermined minimum temperature. In other words, activation of the active material does not occur until a predetermined minimum temperature is reached, at which time the active material undergoes a change in a property, which is effective to change the orientation of the vanes; transitioning the vanes from a closed position to an open position. For example, an SMA wire, whose activation temperature is equal to the specified temperature, acting against a biasing spring can be used to achieve the above result. The SMA wire is exposed to the air in the flow passages within the vent 10. When the temperature of the air is lower than the activation temperature of the SMA wire, the biasing spring is effective to keep the vent 10 closed. In an alternative embodiment, the fan/blower of the circulation system can be turned off until the air has achieved a specified temperature. For example, the bias spring can be effective to keep the switch that closes the fan/blower circuit off. The SMA wire is pre-strained in its martensite phase by the force exerted by bias spring. After the air temperature rises above the activation temperature (i.e., the specified temperature), the SMA wire undergoes a phase transformation that is accompanied by a recovery of the pre-strain. The SMA wire and bias spring are chosen such that the force generated during the phase transformation is sufficient to overcome the force exerted by the bias spring and thus, can be used to open the vent 10, or in the alternative, to throw the switch that closes the fan/blower circuit.

Figure 4A:
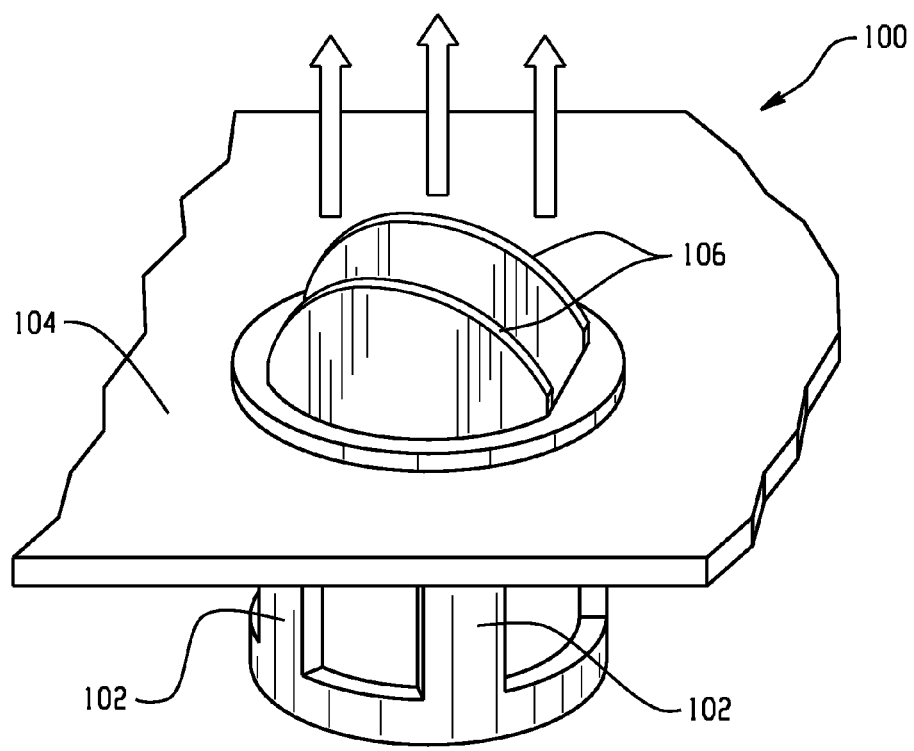
FIGS. 4A-4B are schematic representations of baffle plates in a vent.
Figure 4B:
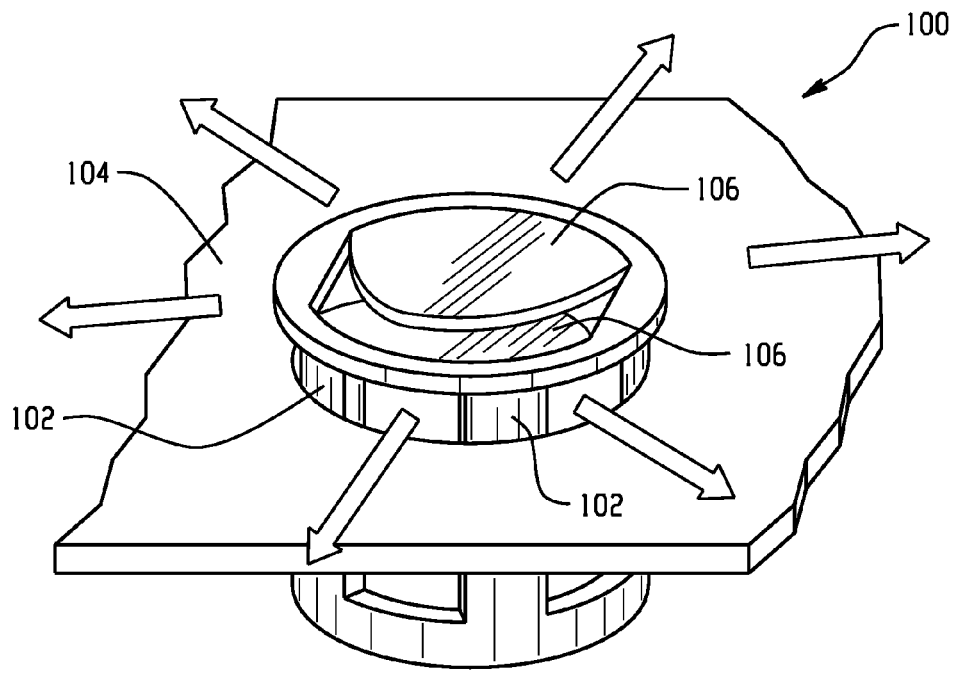

Referring now to FIG. 4, another exemplary embodiment of an active material enabled vent 100 is illustrated. The vent 100 advantageously includes baffle plates 102, which can be used to create a gentle circulation of air within a vehicle cabin without blowing air directly on a driver's or passenger's face. The baffle plates 102 can be an optional component of the vents 10 disclosed above, or in the alternative, they can comprise additional vents separate from the dual-vane vents. As shown in FIG. 4(a), the active material enabled vent 100 is in operative communication with a rigid support 104, such as a vehicle dashboard, and is configured to function with the functionally binary active material actuators as described above. In this particular embodiment, only one actuator (not shown) would be needed to selectively orient vanes 106. In FIG. 4(a), the vent 100 is shown with the vanes 106 in the open position and the arrows represent the airflow path out of the vent 100. When it is desired by the occupant to redirect the air, the vanes 106 can be closed by the binary active material actuator and the baffle plates 102 are permitted to protrude from the rigid support 104 to deflect the airflow path sideways (as indicated by the arrows in FIG. 4(b)). The baffle plates 102 can be deployed in a variety of methods. In one embodiment, the baffle plates 102 can be spring loaded, such that upon manual or electronic releasing of a restraint, such as a latch or stop (not shown), the baffle plates pop out under the force of the spring. In such an embodiment, the springs are of a stiffness sufficiently low to so as not to pose a hazard to occupants having unintentional contact with the vent 100 when the baffle plates 102 deploy. Alternatively, the baffle plates 102 can be configured to deploy when the air pressure flowing through the closed vent 100 reaches a certain level.

In each embodiment of the vent 100, the baffle plates can be returned to their default (or stowed) position manually by simply pushing the plates back into the rigid support 104 and reconfiguring the restraint, for example, latching the baffle plates 102 back down. Alternatively, an active material actuator 12 can be used to counteract the air pressure or spring load to restore the baffle plates to the stowed position when their use is not required.

Figure 5A:
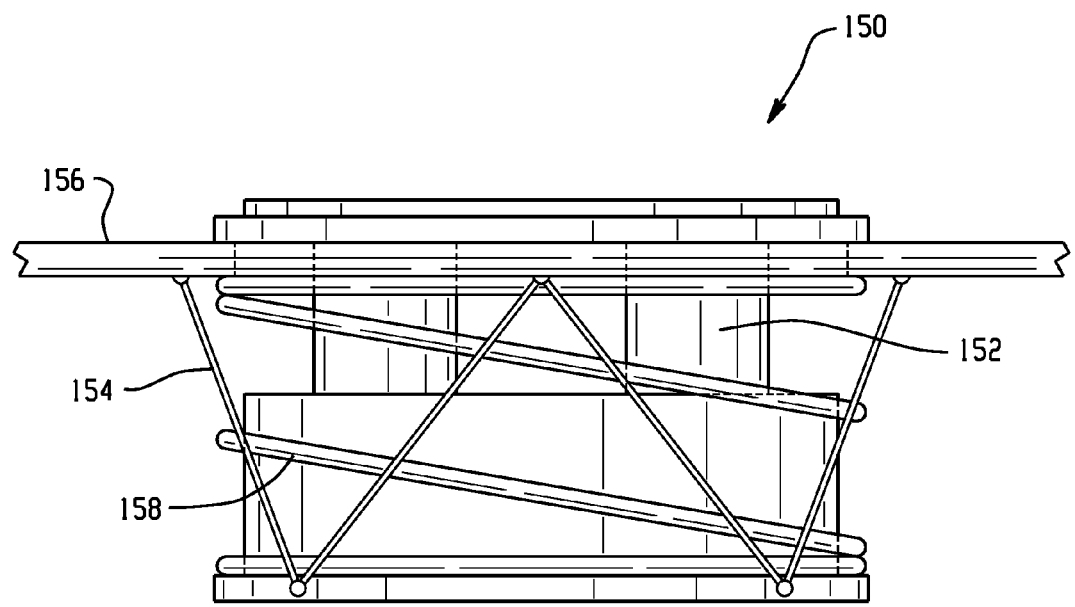
FIGS. 5A-5B are schematic representations of an active material enabled baffle plate.
Figure 5B:
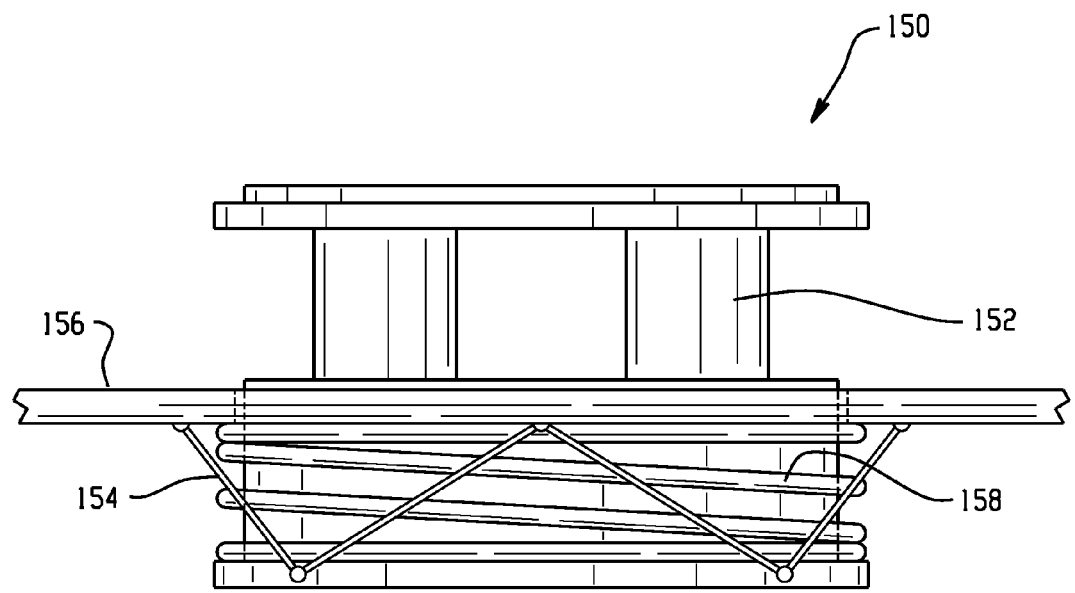

Turning now to FIG. 5, yet another exemplary embodiment of a vent 150 comprising baffle plates 152 is illustrated. In this embodiment, the baffle plates 152 can be deployed upon receipt of an activation signal by SMA wires 154. The SMA wires are in operative communication with the baffle plates 152 and the rigid support 156. Likewise, the baffle plates 152 can be stowed by a return spring 158, which is in operative communication with the baffle plates 152, upon termination of the activation signal. In operation, the SMA wires 154, which are martensitic at room temperature, are heated to their austenitic state by electric resistance heating (electrical wires not shown) when an occupant desires the baffle plates 152 to be deployed. Upon receipt of the heat signal, the SMA wires 154 contract in a length dimension. The contraction is effective to overcome the restraining force exerted by return spring 158 and deploy the baffle plates 152. In this particular embodiment, the SMA wires 154 must then be continually heated even after the baffle plates 152 are deployed to prevent reversion of the SMA wires 154 to the soft, martensitic state under which the return spring 158 would stretch the SMA wires and return the baffle plates 152 to the stowed position. In order to have the baffle plates 152 remain deployed even when the heat signal is removed from the SMA wires 154, a locking mechanism (not shown) should be used. When it is desired, the locking mechanism can be released and the return spring 158 can return the baffle plates 152 to the stowed position. To reiterate, the properties of SMA, as well as other suitable active materials, will be discussed in more detail below. In another embodiment, the baffle plates can be used to avoid blowing cold air directly on an occupant's face until the air reaches a predetermined temperature, as described above.

The active material enabled vents as disclosed herein can also be used for visual, auditory, and haptic interaction with the driver and/or passengers. The active material enabled vents can be operated such that spatial distribution, magnitude (flow velocity and volume), and temporal variations of the air flow rate, the flow direction, and the temperature of the flowing air can all be used to indicate (i.e., alert, inform, or otherwise communicate) to a driver a specific vehicle condition. For example, in one embodiment, if it has been determined that the driver is drowsy (e.g. as inferred from the various sensors mounted in the vehicle or via information obtained from a telematics service, a vehicle communications network, or the like) a steady or pulsating stream of air having a different temperature (e.g. colder) than the ambient temperature in the interior cabin can be directed at the face, hands, or the like to alert the driver. In another embodiment, airflow from the appropriate direction may be used to warn the driver of another vehicle in a particular spot (e.g., such as a blind spot). For example, if the driver intends to change to a new lane on the right and a second vehicle is in the driver's blind spot, then air flow from the active material enabled vents could blow from right to left across the driver's face, hands, or the like to indicate the presence of the second vehicle. In this example, the vents could be activated by an activation device that is turned on when the turn indicator is activated in anticipation of the lane change. Similarly, airflow from the side may be used to warn the driver of any departure from the current lane (e.g. when the turn indicator is inactive).

Materials that can undergo an appreciable and controllable change in their properties in response to a stimulus are known as active or smart materials. The change is reversible in most cases, e.g., just the removal of the stimulus or application of an opposite stimulus causes a reversal in the change of the material properties. An active material may undergo a change in its: mechanical properties such as physical dimensions, elastic moduli, viscosity, and the like; thermal properties such as conductivity, emissivity, and the like; electrical properties such as resistance, electric field, and the like; optical properties such as reflectance, transmissivity, and the like; magnetic properties such as permeability, magnetic field, and the like. The stimulus inducing the changes in one or more properties of the active material may be: a mechanical stimulus such as a change in an applied load; an electrical stimulus, such as a change in an applied electric field; a thermal stimulus, such as a change in the temperature of the environment; an optical stimulus, such as a change in the wavelength of incident light; a magnetic stimulus, such as a change in the applied magnetic field, etc. Active materials are good transducers (i.e. converters of energy from one form to another) because they exhibit a strong coupling between two or more of their properties. The excellent transduction characteristics of active materials make them attractive for use as sensors and/or actuators.

Examples of active materials include, without limitation, shape memory alloys ("SMAs"; e.g., thermal and stress activated shape memory alloys and ferro-magnetic shape memory alloys (FMSMA)), electroactive polymers ("EAPs"; such as dielectric elastomers, ionic polymer metal composites "IPMC"), piezoelectric materials (e.g., polymers, ceramics), and shape memory polymers (SMPs), shape memory ceramics (SMCs), baroplastics, magnetorheological (MR) materials (e.g., fluids, foams and elastomers), electrorheological (ER) materials (e.g., fluids, foams and elastomers), hydrogels, and composites of the foregoing active materials with non-active materials, systems comprising at least one of the foregoing active materials, and combinations comprising at least one of the foregoing active materials.

Active material actuators offer the potential for a reduction in actuator size, weight, volume, cost, noise and an increase in simplicity, robustness and/or reliability of the overall system in comparison with traditional electromechanical and hydraulic means of actuation. The reduction in size, weight and volume of the actuator accrues from the inherent high energy density of active materials as compared to traditional actuators. Active materials accomplish this by combining energy conversion and generation of actuation force at the material level. Some materials can also be used as sensors thereby providing a built-in means of controlling the actuator system.

Shape-memory Alloy (SMA) is the generic name given to alloys that exhibit the unusual property of a strain memory which can be induced either mechanically or thermally. This unusual property is characterized primarily by two thermo-mechanical responses known as the Shape-Memory Effect (SME) and Superleasticity. Austenite, or the parent phase in a SMA, is stable at temperatures above a characteristic temperature referred to as the Austenite finish (Af) temperature. At temperatures below the Martensite finish (Mf) temperature, the SMA exists in a lower modulus phase known as martensite. The unusual thermo-mechanical response of SMAs is attributed to reversible, solid-state, thermo-elastic transformations between the austenite and martensite phases.

Three other characteristic temperatures are commonly used to identify the state of an SMA material. When an SMA sample is cooled, martensite starts nucleating at the Martensite start (Ms) temperature; when the sample is heated, the martensite to austenite transformation starts at the Austenite start (As) temperature. The SMA exhibits the SME most prominently at temperatures below Mf, and the material has to be above the Af temperature for superelastic behavior. At temperatures above Md, the SMA loses its unique properties and behaves like an ordinary material. In many of the SMAs, these temperatures are related as follows: Mf<Ms<As<Af<Md, wherein As is the austenite start temperature and Ms is the martensite start temperature. These SMAs will be used, without loss of generality, in examples to illustrate the use of SMAs in applications.

The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). On the application of a mechanical load to an SMA material below As, initially, the martensitic material deforms elastically. When the stress in the sample reaches a critical stress known as the first yield point of martensite, the deformation occurs at a nearly constant stress via a shear-like mechanism known as de-twinning. De-twinning is associated with a cooperative rearrangement of the atoms by the sliding of atomic planes (twin interfaces) in the crystal structure of the SMA. Although the displacement of each atom is small, the overall deformation of the SMA can be significant (e.g. up to 8% strain vs. <1% strain for most metals) due to the accumulation of the coordinated motion of all or most of the atoms in the material. Unlike plastic deformation in ordinary metals (e.g. Al) which occurs by the motion of dislocations and hence is irreversible, the deformation of martensitic SMA via the de-twinning mechanism does not involve dislocation motion or breaking of inter-atomic bonds. Therefore, the deformation is reversible.

Heating the deformed sample above the As temperature induces a martensite to austenite transformation. The martensite phase can have multiple energetically-equivalent microstructures corresponding to different induced strains. In contrast, the austenite phase has only one microstructure, which is restored during the martensite to austenite transformation. Therefore, this transformation causes the SMA material to recover the original form imparted to it during manufacture. In other words the pseudoplastic strain is recovered completely by heating the deformed SMA above Af. Cooling the material to below Mf after the martensite to austenite transformation is complete, does not lead to any further change in form. This phenomenon in which an SMA material recovers apparent plastic deformation, imparted at a low temperature, upon heating to a higher temperature is known as the Shape-Memory Effect. If the change of form (e.g. shape, dimension, etc.) associated with martensite to austenite transformation in a pseudo-plastically deformed SMA material, is resisted by an externally applied force/constraint, a considerable internal stress is developed to oppose the external force/constraint. This force can be used to drive an external load, thereby enabling the SMA material to be used as an actuator. The recovery to the austenite phase at a higher temperature is accompanied by very large stresses which can be as high as the inherent yield strength of the austenite material; these stresses can sometimes reach up to three or more times that of the deformed martensite phase. For applications that require a large number of operating cycles, a strain of less than or equal to 4% or so of the deformed length of wire used can be obtained.

In the foregoing description the SMA material had a unique form (shape, configuration, dimension, etc.) associated with an unloaded SMA sample above Af, but it could exist in many different forms at temperatures below Mf. Thus, the material exhibits a 'memory' only on heating, and hence, this phenomenon is known as the one-way SME. Thermo-mechanical processing can impart an SMA the ability to exhibit an intrinsic two-way shape memory effect. Suitably processed SMA material can remember two shapes—one associated with temperatures above Af and the other with temperatures below Mf. Heating an unloaded sample of such a material above Af would cause the sample to attain its high temperature shape, while cooling it below Mf would revert it back to its low temperature shape. Currently, SMAs that exhibit the one-way SME have matured to a point where they have been used in a number of commercial applications. In contrast, materials that exhibit two-way SME (TWSME) are still in the developmental stage. However, in many practical applications the behavior of an element made from an SMA that exhibits intrinsic TWSME, can be reproduced by a system comprising an element made from an SMA that exhibits one-way SME in mechanical opposition to another element known as the bias element. Such systems are said to exhibit extrinsic TWSME. In these systems, one of the two elements dominates the other at temperatures below Mf, leading to one form (or equilibrium configuration) for the system. When the SMA is heated above its Af, the stiffness of the SMA element increases, thereby changing the equilibrium configuration of the system to its high temperature form. Subsequent cooling of the SMA element causes the system to revert to its low temperature form.

A suitable activation input or signal for use with shape memory alloys is a thermal activation signal having a magnitude that is sufficient to cause transformations between the martensite and austenite phases.

Many SMA materials exhibit the ability to undergo large, recoverable strains (up to 8%) when they are loaded at a temperature above Af. This phenomenon is known as superelasticity. If an SMA material in its austenite phase is subjected to a load, it initially deforms elastically. A stress-induced austenite to martensite phase transformation is initiated when the stress in the material reaches a critical value, which is below the critical stress for slip (i.e. dislocation movement in the crystal). This transformation occurs via a shear-like mechanism that is similar to the one responsible for the de-twinning of martensite. As the martensite phase is not stable above Af, if the material is unloaded at that temperature, the reverse (i.e. austenite to martensite) transformation occurs spontaneously and the large strains induced during loading can be completely recovered.

The material exhibits hystresis i.e. the loading and unloading paths in the material's response do not coincide. If the above loading-unloading cycle is represented graphically on a stress versus strain coordinates, the area enclosed between the loading and unloading branches of the graph represents the energy dissipated per unit volume of the material. The superelastic behavior of SMAs is associated with significant hysteresis, which makes these materials suitable for some energy dissipation applications.

The characteristic temperatures can be adjusted by slight changes in the composition of the alloy and through thermomechanical processing. In nickel-titanium shape memory alloys, for example, Af can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

Some ferromagnetic materials (e.g. certain Ni—Mn—Ga alloys) undergo substantial change in dimension (e.g. 10% strain) when subjected to a magnetic field. This dimension change takes place via a shear-like mechanism (de-twinning) involving co-operative rearrangement of the crystal structure within the element such that no inter-atomic bonds are broken in the process. Therefore, the deformation is reversible and the material can be reverted to its unstrained form by the application of an opposing magnetic field or external force. Such materials are known as Ferromagnetic or Magnetic Shape Memory Alloys (F/MSMA). The ability of an external magnetic field to magnetize an F/MSMA element and thereby induce a change in its dimensions is the basis for using these materials as actuators. F/MSMAs also exhibit the reverse effect. If an F/MSMA element is deformed in a magnetic field, the magnetization of the element changes. This affects the magnetic field and/or the magnetic permeability of the F/MSMA. Therefore, F/MSMAs can also be used as sensors.

A typical F/MSMA actuator comprises a F/MSMA element, a core (usually ferromagnetic), electric current carrying coils that produce the actuating magnetic field, and a means of reversing the magnetic field induced deformation. Springs that oppose the field-induced deformation of the F/MSMA element are commonly used to return the element to its un-actuated configuration after the magnetic field is switched off. The reversal of the deformation can also be accomplished by using a permanent magnet-induced biasing field that opposes the field produced by the actuator coils, by rotating the actuating magnetic field through 90 degrees, by using two opposing F/MSMA elements, etc.

F/MSMAs exhibit the shape memory effect and superelasticity that are associated with thermally activated SMAs. However, unlike thermally activated SMAs, the dimension change induced by a magnetic field in F/MSMAs takes place when the material is completely in the martensite phase. As there is no concomitant phase change, the change in dimensions in a magnetically-activated F/MSMA is much faster than in thermally-activated SMAs e.g. due to the constraint imposed by the slower cooling process SMA actuators can typically be operated in the 0-10 Hz range, whereas F/MSMA actuators can typically be operated in the 100-1000 Hz range. F/MSMAs are known to have excellent fatigue resistance. Elements of this material have shown little degradation in performance after 108 cycles.

As the useful behavior of F/MSMAs is limited to the martensite phase, they have a narrower operating temperature range (e.g. 5M Ni—Mn—Ga can be used from −50 to 67 C) than thermally-activated SMAs. Although F/MSMAs can produce large strains (e.g. approx. 6-10%) that are comparable to those produced by thermally-activated SMAs, the maximum stress developed by these materials (approx 1.5 MPa) is smaller than that developed by thermally-activated SMAs. F/MSMA-based actuators tend to be bulkier than comparable thermal SMA actuators because of the need to include a magnetic field generator and core.

Shape memory polymer (SMP) generally refers to a polymeric material, which exhibits a change in a property, such as a modulus, a coefficient of thermal expansion, the permeability to moisture, an optical property (e.g., transmissivity), or a combination comprising at least one of the foregoing properties in combination with a change in its microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electro-magnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion— the pH of the environment), or a combination comprising at least one of the foregoing.

Generally, SMPs are phase segregated co-polymers comprising at least two different units (e.g. monomers, oligomers, ionomers of different species, or of the same species with different characteristics such as tacticity), which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes.

For example, with baroplastic materials, a pressure induced mixing of nanophase domains of high and low glass transition temperature (Tg) components effects the shape change. Baroplastics can be processed at relatively low temperatures repeatedly without degradation. Shape memory ceramics (SMCs) are similar to SMAs but can tolerate much higher operating temperatures than can other shape-memory materials. An example of an SMC is a piezoelectric material.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators which are constructed so as to bow into a concave or convex shape upon application of a relatively small voltage. The morphing/bowing of such patches within the liner of the holder is suitable for grasping/releasing the object held.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of polymers include poly(sodium 4-styrene-sulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (methacrylic acid ("PMA"), and their derivatives; polyUreas, and their derivatives; polyUrethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and combinations comprising at least one of the foregoing; and Group VIA and IIB compounds, such as CdSe, CdS, GaAs, $AgCaSe_2$, ZnSe, GaP, InP, ZnS, and combinations comprising at least one of the foregoing.

MR fluids is a class of smart materials whose theological properties can rapidly change upon application of a magnetic field (e.g., property changes of several hundred percent can be effected within a couple of milliseconds), making them quite suitable in locking in (constraining) or allowing the relaxation of shapes/deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension moduli by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state. Packaging of the field generating coils, however, creates challenges.

MR fluids exhibit a shear strength which is proportional to the magnitude of an applied magnetic field, wherein property changes of several hundred percent can be effected within a couple of milliseconds. Although these materials also face the issues resulting from the packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 10 to about 100 micrometers.

The viscosity of the carrier can be less than or equal to about 100,000 centipoise (cPs) (e.g., about 1 cPs to about 100,000 cPs), or, more specifically, about 250 cPs to about 10,000 cPs, or, even more specifically, about 500 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electrorheological fluids (ER) fluids are similar to MR fluids in that they exhibit a change in shear strength when subjected to an applied field, in this case a voltage rather than a magnetic field. Response is quick and proportional to the strength of the applied field. It is, however, an order of magnitude less than that of MR fluids and several thousand volts are typically required.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyUrethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material propert(ies) such as a high electrical breakdown strength, a low modulus of elasticity (e.g., for large or small deformations), a high dielectric constant, and so forth. In one embodiment, the polymer can be selected such that it has an elastic modulus of less than or equal to about 100 MPa. In another embodiment, the polymer can be selected such that it has a maximum actuation pressure of about 0.05 megaPascals (MPa) and about 10 MPa, or, more specifically, about 0.3 MPa to about 3 MPa. In another embodiment, the polymer can be selected such that it has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids. These materials possess a very fast response capability, with the strain proportional to the strength of the applied magnetic field, and they return to their starting dimension upon removal of the field. However, these materials have maximum strains of about 0.1 to about 0.2 percent.

Electrostrictive materials are similar in operation to magnetostrictive materials with the modification that they experience a mechanical strain in response to an applied electric field. Lead magnesium niobate (PMN) is an example of an electrostrictive material.

The application and functionality of the active material enabled vents will determine which active material is best suited for the particular vent. Factors such as force, displacement, actuation time, and the like can be used to determine which type of active material is most appropriate. For instance, where an application requires an activation time of about 1 second or greater, an SMA or SMP can be appropriate. Where an application requires shorter activation times, an FMSMA, EAP or MR elastomer can be used.

As stated above, the air vents as disclosed herein advantageously employ active materials to reversibly control the flow rate, direction, spatial flow pattern distribution, and temperature of air through a conditioning system, such as in a motor vehicle. The active material enabled vents are lightweight and inherently robust. Moreover, the active material enabled vents are also of low-cost and of easily adaptable design that can be integrated with limited changes to the existing vehicle interior structure and can be used with existing manually operated vent systems. A vehicle ventilation system can be entirely comprised of active material enabled vents or can employ just a few active material enabled vents together with manually operated vents. For example, when the active material enabled vents are used for haptic interaction, the vents are not restricted to existing vents, rather additional vents can be employed for the express purpose of haptic interaction. Regardless of the ventilation system arrangement, however, each active material enabled vent can be automatically controlled resulting in increased convenience and reduced distraction for a driver and/or passenger.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A vent, comprising:
a vane configured for spatial movement; and
at least one actuator in operative communication with the vane configured to spatially move the vane in at least one direction, wherein the actuator comprises an active material configured to undergo a change in at least one property upon receipt of an activation signal, wherein the change in at least one property is effective to selectively change an orientation of the vane,
wherein the at least one actuator comprises two antagonistically configured sets of sub-actuators each comprising an active material configured to undergo a change in at least one property upon receipt of an activation signal, wherein the change in at least one property is effective to selectively move each of the two antagonistically configured sets of sub-actuators in two directions, wherein the two antagonistically configured sets of sub-actuators each comprise two or more binary sub-actuators, wherein the two or more binary sub-actuators are in serial mechanical communication, and wherein the movement in the two directions of the antagonistically configured sets of sub-actuators is effective to move the two or more binary sub-actuators in series and selectively move the vane, so as to assume three or more angular positions.

2. The vent of claim 1, wherein the change in the at least one property comprises a change in crystal structure, material morphology, a shape, a dimension, a phase, a shape orientation, a modulus, a stiffness, or combinations comprising at least one of the foregoing properties.

3. The vent of claim 1, wherein the activation signal comprises a thermal activation signal, an electric activation signal, a magnetic activation signal, a chemical activation signal, an optical activation signal, an electromagnetic activation signal, a vibratory activation signal, an acoustic activation signal, a mechanical load, or a combination comprising at least one of the foregoing activation signals.

4. The vent of claim 1, further comprising an activation device configured to provide the activation signal to the active material.

5. The vent of claim 4, wherein the activation device is in operative communication with at least one sensor configured to activate the activation device upon detecting a predetermined threshold condition.

6. The vent of claim 1, wherein the actuator is manually overridable.

7. The vent of claim 1, further comprising a stroke adjuster in operative communication with the active material configured to prevent overloading and/or overstraining of the active material, and to provide adjustment of a stroke length of the active material.

8. The vent of claim 1, further comprising a baffle plate in operative communication with the vane and the actuator.

9. A method for controlling a condition of airflow in a vehicle, comprising:

activating an active material in an actuator in operative communication with a vane configured for spatial movement, wherein the active material is configured to undergo a change in at least one property upon receipt of an activation signal, wherein the change in at least one property is effective to selectively move the vane;

modifying a plurality of antagonistic sub-actuators, each comprising a plurality of binary sub-actuators connected in serial mechanical communication, as a result of the change, and changing the orientation of the vane, so as to assume three or more angular positions, as a result of modifying the sub-actuators.

10. The method of claim 9, wherein changing the orientation of the vane is effective to change a direction, volume, spatial distribution pattern, temperature, velocity, or a combination comprising at least one of the foregoing of the airflow.

11. The method of claim 9, wherein the change in the condition of the airflow is effective to indicate a specific vehicle condition to an occupant by a visual indication, an auditory indication, a haptic indication, or a combination comprising at least one of the foregoing indications.

12. The method of claim 9, further comprising controlling the orientation of the vane based on pre-specified automatic modes of operation in response to an input from at least one information source.

13. The method of claim 12, wherein the pre-specified automatic modes of operation comprise a defogging mode, a redirection of air to a specific region of the vehicle mode, a purge of a noxious vapor mode, a circulation mode after a transient condition, or combinations comprising at least one of the foregoing modes.

14. The method of claim 9, wherein changing the condition of the airflow comprises directing the airflow away from an occupant during a transient temperature period.

15. The method of claim 9, wherein activating the active material comprises reaching a predetermined minimum air temperature and wherein changing the orientation of the vane comprises transitioning the vane from a closed position to an open position.

* * * * *